(12) United States Patent
Chuang et al.

(10) Patent No.: US 7,468,845 B2
(45) Date of Patent: Dec. 23, 2008

(54) ZOOM LENS

(75) Inventors: Fu-Ming Chuang, Hsinchu (TW); Kuo-Chuan Wang, Hsinchu (TW)

(73) Assignee: Young Optics Inc., Hsinchu (TW)

( * ) Notice: Subject to any disclaimer, the term of this patent is extended or adjusted under 35 U.S.C. 154(b) by 44 days.

(21) Appl. No.: 11/562,997

(22) Filed: Nov. 23, 2006

(65) Prior Publication Data

US 2007/0171542 A1      Jul. 26, 2007

(30) Foreign Application Priority Data

Jan. 25, 2006    (TW) ............................... 95102749 A

(51) Int. Cl.
*G02B 15/14* (2006.01)
(52) U.S. Cl. .................... 359/687; 359/676; 359/686
(58) Field of Classification Search ................. 359/683, 359/686, 687
See application file for complete search history.

(56) References Cited

U.S. PATENT DOCUMENTS

| | | | |
|---|---|---|---|
| 4,789,226 A * | 12/1988 | Ogata | 359/687 |
| 5,528,423 A * | 6/1996 | Arimoto et al. | 359/687 |
| 5,583,697 A | 12/1996 | Mukaiya | |
| 6,178,049 B1 | 1/2001 | Mukaiya et al. | |
| 6,519,094 B1 | 2/2003 | Boku et al. | |
| 6,542,312 B1 | 4/2003 | Okayama et al. | |
| 6,587,280 B2 | 7/2003 | Horiuchi | |
| 6,606,194 B2 | 8/2003 | Hamano et al. | |

FOREIGN PATENT DOCUMENTS

| | | |
|---|---|---|
| CN | 1222805 | 10/2005 |
| CN | 1739052 | 2/2006 |
| WO | 2005/103789 | 11/2005 |

* cited by examiner

*Primary Examiner*—Darryl J Collins
(74) *Attorney, Agent, or Firm*—Jianq Chyun IP Office

(57) ABSTRACT

A zoom lens suitable for imaging an object on a photosensitive element is provided. The zoom lens includes a first lens group, a second lens group disposed between the first lens group and the photosensitive element, a third lens group disposed between the second lens group and the photosensitive element, and a fourth lens group. The second lens group is suitable for moving between the first lens group and the third lens group. The third lens group includes two lenses having positive refractive power. The fourth lens group is disposed and suitable for moving between the third lens group and the photosensitive element. The refractive powers of the first lens group, the second lens group, the third lens group, and the fourth lens group are a positive value, a negative value, a positive value, and a positive value respectively.

9 Claims, 7 Drawing Sheets

ZOOM LENS

CROSS-REFERENCE TO RELATED APPLICATION

This application claims the priority benefit of Taiwan application serial no. 95102749, filed Jan. 25, 2006. All disclosure of the Taiwan application is incorporated herein by reference.

BACKGROUND OF THE INVENTION

1. Field of the Invention

The present invention relates to a zoom lens. More particularly, the present invention relates to a low-cost zoom lens.

2. Description of Related Art

With the development of modern video technology, imaging devices such as Digital Video Cameras (DVC) and Digital Cameras (DC) have become widely popular. One of the core components of these imaging devices is a zoom lens. With the optical zoom of the zoom lens, images can be clearly focused on a Charge Coupled Device (CCD), so the imaging quality relies greatly on the optical quality of the zoom lens. In the highly competitive market, manufacturers are all devoted to improving the quality of the zoom lenses, and reduce the manufacturing costs so as to enhance the competitive edge of imaging devices.

Referring to FIG. 1, a conventional zoom lens 100 is disclosed in U.S. Pat. No. 5,583,697. The zoom lens 100 includes four lens groups 110, 120, 130, and 140, the lens group 110 comprises three lenses 112, the lens group 120 comprises three lenses 122, the lens group 130 comprises three lenses 132, and the lens group 140 comprises two lenses 142.

The conventional zoom lens 100 zooms in or zooms out by the relative movement of the lens group 120 and the lens group 140. When the distance to the object to be captured changes, the image of the object is made clear by adjusting the position of the lens group 140 and focusing. In comparison with the architecture using front group focusing, the architecture using rear group focusing effectively reduces the volume and length of the lens.

However, in the zoom lens 100, as the lens group 130 comprises one aspheric lens that is glass molding lens and fitted with two spherical lenses, it is difficult to improve the overall yield in mass production. In addition, aspheric molding glass lenses are important in correcting image aberration, but in the lens group 130, the aspheric molding glass lens is fitted with two spherical lenses with high refractive index at the same time, so the tolerance accumulation is too high and is harmful to the overall yield in mass production, and thus the manufacturing cost is increased.

SUMMARY OF THE INVENTION

The present invention is related to a zoom lens with reducing manufacturing cost.

To achieve aforementioned and other objects, a zoom lens suitable for imaging an object on a photosensitive element is provided. The zoom lens includes a first lens group, a second lens group, a third lens group, and a fourth lens group. The first lens group has a positive refractive power, and the second lens group has a negative refractive power, and is disposed between the first lens group and the photosensitive element. The third lens group has a positive refractive power, and is disposed between the second lens group and the photosensitive element, and the second lens group is suitable for moving between the first lens group and the third lens group. The third lens group includes two lenses having positive refractive power. Furthermore, the fourth lens group has a positive refractive power and is disposed between the third lens group and the photosensitive element, and the fourth lens group is suitable for moving between the third lens group and the photosensitive element.

The first lens group includes a first lens, a second lens, and a third lens. The second lens is disposed between the first and third lenses, and the third lens is disposed between the second lens and the second lens group. Moreover, the first lens has a negative refractive power, the second lens has a positive refractive power, and t the third lens has a positive refractive power.

The second lens group includes a fourth lens, a fifth lens, and a sixth lens. The fifth lens is disposed between the fourth and the sixth lenses, and the sixth lens is disposed between the fifth lens and the third lens group. Moreover, the fourth lens has a negative refractive power, the fifth lens has a negative refractive power, and the sixth lens has a positive refractive power.

The lenses of the third lens group include a seventh lens and an eighth lens, and the eighth lens is disposed between the seventh lens and the fourth lens group. At least one of the seventh and eighth lenses is an aspheric lens. The seventh and the eighth lenses have the positive refractive power.

The aspheric lens is, for example, a glass molding lens, a hybrid lens, or a plastic lens.

One of the lenses of the third lens group closer to the second lens group is a meniscus lens, and the meniscus lens is convex to the object.

The fourth length group includes a ninth lens and a tenth lens, and the tenth lens is disposed between the ninth lens and the photosensitive element. Moreover, the ninth lens has a negative refractive power, and the tenth lens has a positive refractive power.

The second lens group is suitable for moving from the first lens group to the third lens group, so as to shift the magnification of the zoom lens from a wide-end to a tele-end. The effective focal length of the zoom lens at the wide-end is A1, and the diameter of the lens of the third lens group closer to the second lens group is A2, $0.4 < A1/A2 < 0.5$.

The effective focal length of the third length group is A3, and the effective focal length of the fourth lens group is A4, $1.5 < A3/A4 < 2$.

Under various magnification factors of the zoom lens, the incidence angle of the chief ray of the imaging light beam of the object incident to the photosensitive element is, for example, less than 10 degrees.

Compared with a conventional zoom lens having 11 lenses, the present invention reduces a number of lenses of the third lens group to two, thus reducing tolerance accumulation. Therefore, in addition to decreasing the material cost of the lens, the manufacturing cost is further reduced by improving the yield of the entire zoom lens.

In order to make the aforementioned and other objects, features and advantages of the present invention comprehensible, a preferred embodiment accompanied with figures is described in detail below.

DESCRIPTION OF EMBODIMENTS

Figure 2A:
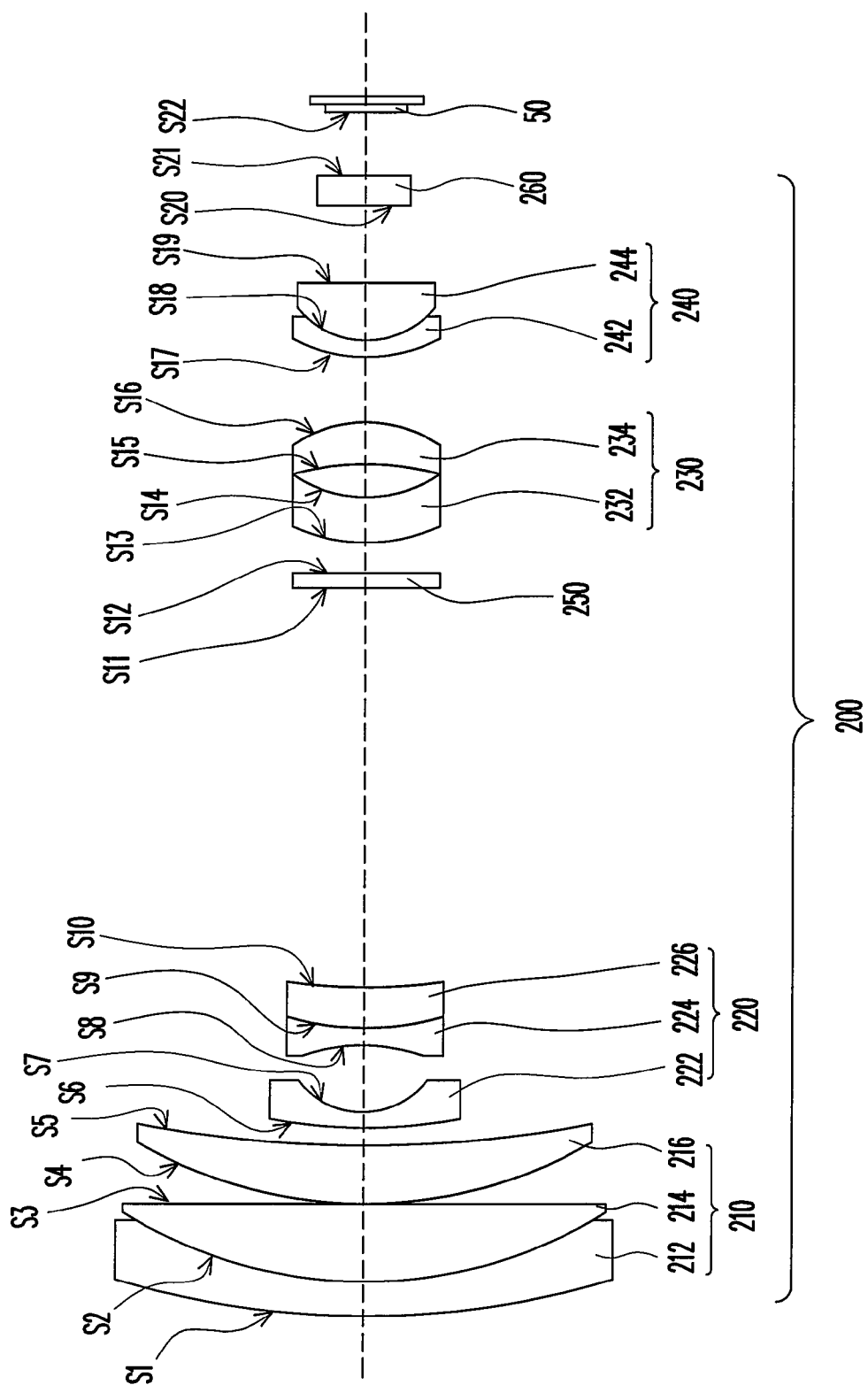
FIGS. 2A-2C are schematic structure views of zoom lens under different zoom magnifications according to one embodiment of the present invention.
Figure 2B:
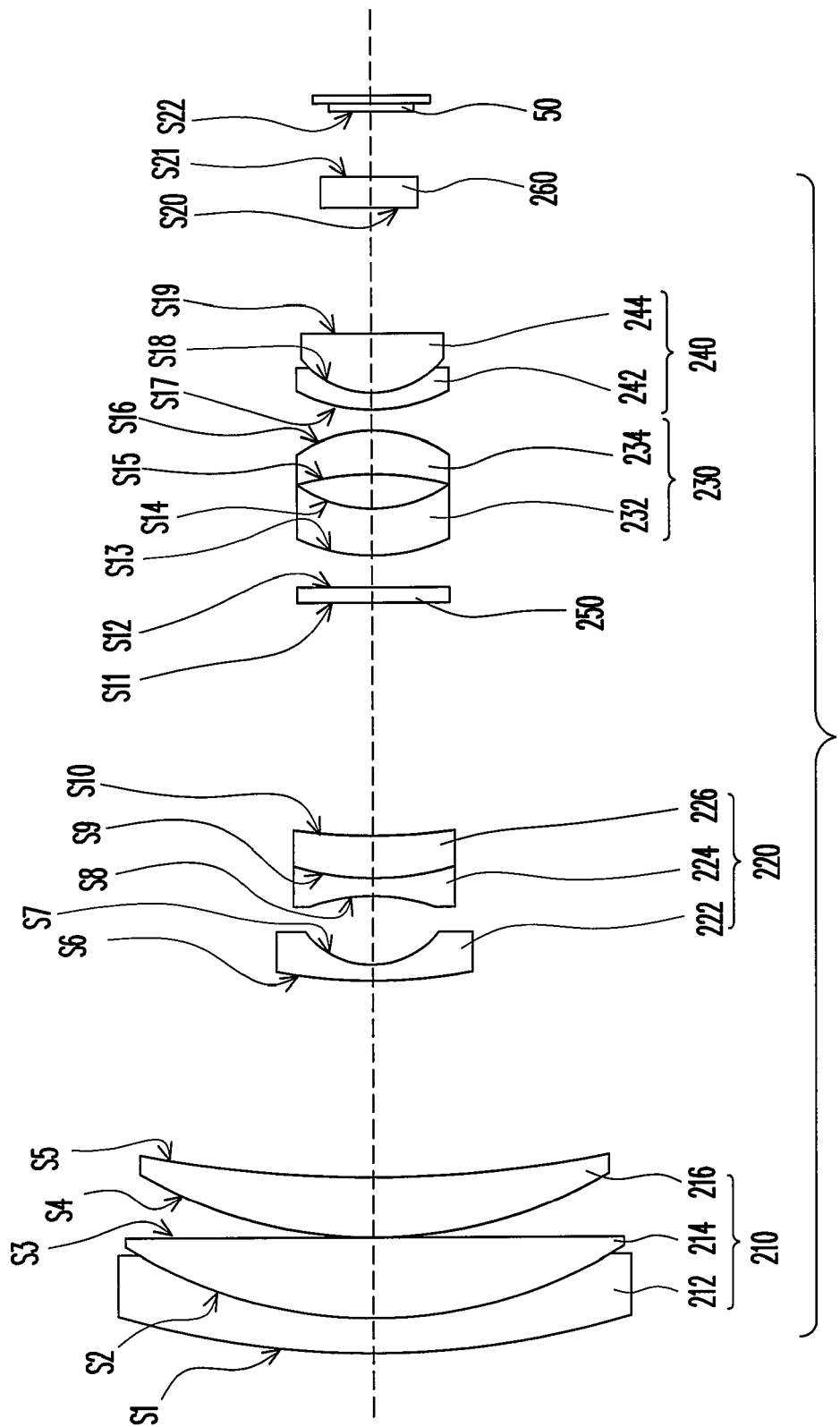
Figure 2C:
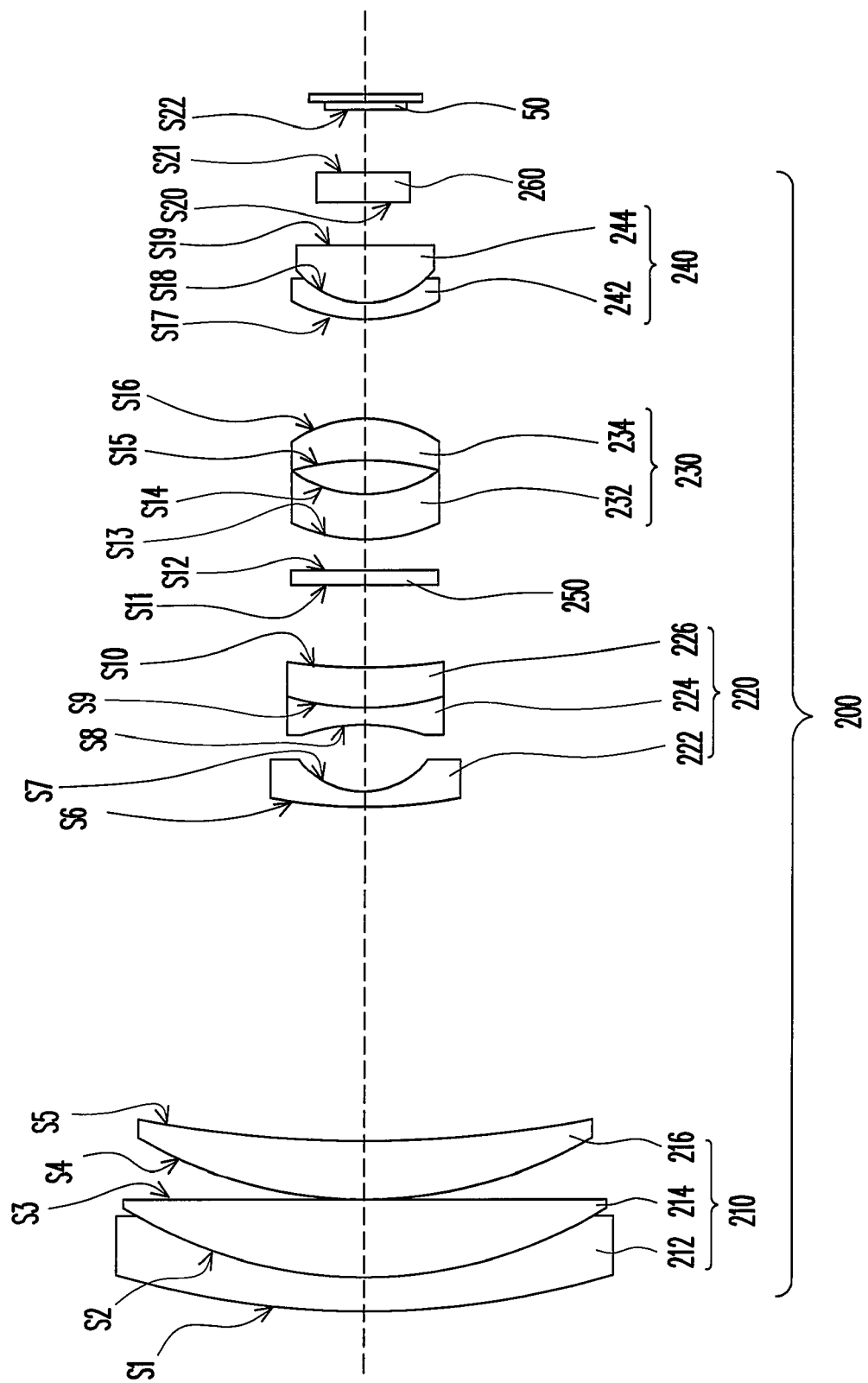

FIGS. 2A-2C are schematic structure views of a zoom lens under different zoom magnifications according to one embodiment of the present invention. FIG. 2A shows the structure of the zoom lens at the wide-end, FIG. 2B shows the structure of the zoom lens at a middle position, and FIG. 2C shows the structure of the zoom lens at the tele-end. Referring to FIGS. 2A-2C, the zoom lens 200 of the embodiment is suitable for imaging an object on a photosensitive element 50, such as a Charge Coupled Device (CCD) or a Complementary Metal-Oxide Semiconductor (CMOS). The zoom lens 200 includes a first lens group 210, a second lens group 220, a third lens group 230, and a fourth lens group 240. The second lens group 220 is disposed between the first lens group 210 and the photosensitive element 50. The third lens group 230 is disposed between the second lens group 220 and the photosensitive element 50, and the second lens group 220 is suitable for moving between the first lens group 210 and the third lens group 230. Furthermore, the fourth lens group 240 is disposed between the third lens group 230 and the photosensitive element 50, and the fourth lens group 240 is suitable for moving between the third lens group 230 and the photosensitive element 50.

Accordingly, the first lens group 210, the second lens group 220, the third lens group 230, and the fourth lens group 240 have a positive refractive power, a negative refractive power, a positive refractive power, and a refractive positive power respectively. With this combination, image aberration and chromatic aberration are effectively reduced or eliminated. In addition, the third lens group 230 includes two lenses 232, 234, and the refractive powers of the two lenses 232, 234 have positive refractive power.

In the zoom lens 200 according to the embodiment, the first lens group 210 includes a first lens 212, a second lens 214, and a third lens 216 arranged in order, the third lens 216 is adjacent to the second lens group 220, and the first lens 212, the second lens 214, and the third lens 216 have respectively a negative refractive power, a positive refractive power, and a positive refractive power. Furthermore, the second lens group 220 includes a fourth lens 222, a fifth lens 224, and a sixth lens 226 arranged in order, the sixth lens 226 is adjacent to the third lens group 230. The fourth lens 222, the fifth lens 224, and the sixth lens 226 have respectively a negative refractive power, a negative refractive power, and a positive refractive power. Moreover, the lens 232 of the third lens group is the seventh lens, and the lens 234 of the third lens group is the eighth lens. The lens 234 is disposed between the lens 232 and the fourth lens group 240, and the seventh lens 232 and the eighth lens 234 have positive power and a positive power respectively. The fourth lens group 240 includes a ninth lens 242 and a tenth lens 244, the tenth lens 244 is disposed between the ninth lens 242 and the photosensitive element 50, and the ninth lens 242 and the tenth lens 244 have respectively a negative refractive power and a positive refractive power.

In the present invention, at least one of the lens 232 and the lens 234 of the third lens group 230 is an aspheric lens. The aspheric lens is a glass molding lens, a hybrid lens, or a plastic lens. Furthermore, one of the lenses 232, 234 of the third lens group 230 closer to the second lens group 220 (i.e., lens 232) is a meniscus lens, and the meniscus lens is convex to the object.

Figure 1:
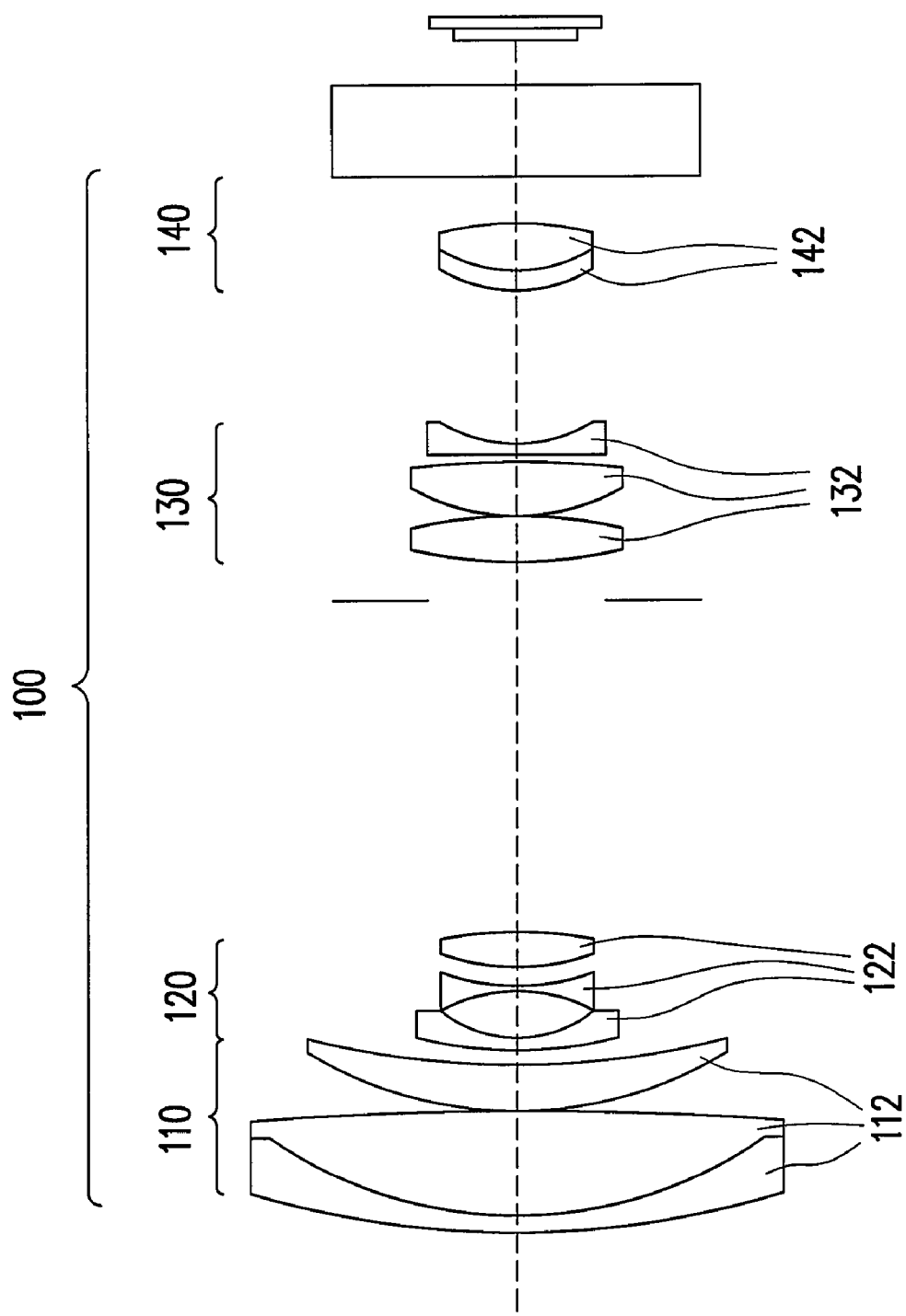
FIG. 1 shows the schematic structure view of a conventional zoom lens.

As the conventional zoom lens 100 (as shown in FIG. 1) comprises 11 lenses, while the zoom lens 200 of the present invention comprises only 10 lenses because the number of lenses of the third lens group 230 is reduced to two, the material cost of lenses is reduced, and the tolerance accumulation is reduced as well. In addition, as the structure of the zoom lens 200 is simple, the yield thereof is improved, and the manufacturing cost thereof is further reduced.

In the present embodiment, when the magnification of the zoom lens 200 changes from the wide-end (as shown in FIG. 2A) to the middle position (as shown in FIG. 2B), the second lens group 220 and the fourth lens group 240 move in a direction towards the third lens group 230. When the magnification of the zoom lens 200 changes from the middle position to the tele-end (as shown in FIG. 2C), the second lens group moves in a direction towards the third lens group 230, and the fourth lens group 220 moves in an opposite direction towards the photosensitive element 50. In other words, according to the zoom lens 200 of the present invention, the function of zoom in or zoom out is achieved just by moving the second lens group 220 and the fourth lens group 240, so that the transmission mechanism is simple and the cost is relatively low.

Furthermore, according to the zoom lens 200 of the present invention, by moving the fourth lens group 240 away from or close to the photosensitive element 50, the imaging position is adjusted, such that clear images are focused by the zoom lens 200. That is, in addition to the function of zooming, the fourth lens group 240 also has the function of image compensation, thus avoiding problems of image aberration and imaging plane offset.

It is noted that in order to ensure imaging quality, the specific value of the effective focal length A1 of the zoom lens 200 at the wide-end to the diameter A2 of the lens 232 (i.e. A1/A2) is between 0.4 and 0.5. Furthermore, in order to reduce the volume of the zoom lens 200, the specific value of the effective focal length A3 of the third length group 230 to the effective focal length A4 of the fourth lens group (i.e. A3/A4) is between 1.5 and 2. Moreover, under various magnification factors of the zoom lens 200, the incidence angle of the chief ray of the imaging light beam of the object incident to the photosensitive element 50 is, for example, less than 10 degrees, and preferably is less than 5 degrees.

To make the zoom lens 200 have a better optical quality, the zoom lens 200 further includes an IR cutting-filter 250 and a low-pass filter 260. A preferred embodiment of the zoom lens 200 is illustrated as follows. However, the data listed in the following Table 1 and Table 2 are not intended to limit the present invention. It is apparent to those skilled in the art that some proper modifications can be made to the parameters or settings to achieve the purpose of the present invention, which also falls within the scope of the present invention.

TABLE 1

| Surface | Radius of Curvature (mm) | Distance (mm) | Refractive Index | Abbe Number | Notes |
|---|---|---|---|---|---|
| S1 | 65.52000 | 2.000000 | 1.8467 | 23.78 | The First Lens |
| S2 | 32.20000 | 5.300000 | 1.6180 | 63.33 | The Second Lens |
| S3 | Infinity | 0.100000 | | | |
| S4 | 31.09000 | 4.000000 | 1.7432 | 49.34 | The Third Lens |
| S5 | 87.54000 | Variable Distance | | | |

TABLE 1-continued

| Surface | Radius of Curvature (mm) | Distance (mm) | Refractive Index | Abbe Number | Notes |
|---|---|---|---|---|---|
| S6 | 59.92000 | 1.000000 | 1.8010 | 34.97 | The Fourth Lens |
| S7 | 6.85000 | 3.480000 | | | |
| S8 | −19.85000 | 1.000000 | 1.4875 | 70.24 | The Fifth Lens |
| S9 | 8.81000 | 2.940000 | 1.8467 | 23.78 | The Sixth Lens |
| S10 | 31.75000 | Variable Distance | | | |
| S11 | Infinity | 0.300000 | 1.5163 | 64.15 | IR-Cutting Filter |
| S12 | Infinity | 1.200000 | | | |
| S13 | 8.1932 | 2.8 | 1.5844 | 59.20 | The Seventh Lens |
| S14 | 9.7429 | 1.17 | | | |
| S15 | −68.71 | 1.6 | 1.4875 | 70.24 | The Eighth Lens |
| S16 | −21.66 | Variable Distance | | | |
| S17 | 12.68000 | 1.000000 | 1.8467 | 23.78 | The Ninth Lens |
| S18 | 6.16000 | 3.780000 | 1.6779 | 55.34 | The Tenth Lens |
| S19 | −29.92000 | Variable Distance | | | |
| S20 | Infinity | 2.000000 | 1.5163 | 64.15 | Low-Pass Filter |
| S21 | Infinity | 4.55 | | | |
| S22 | Infinity | 0 | | | |

S13 and S14 are aspheric surfaces, expressed by the following equation:

$$X = \frac{(1/R)H^2}{1+\sqrt{1-(1+K)(H/R)^2}} + AH^4 + BH^6 + CH^8 + DH^{10}$$

X is the offset of the direction of the optical axis, R is the radius of the osculating sphere, i.e. the radius of curvature at a position close to the optical axis (e.g. the radii of curvature of S13 and S14 in the table above), H is the height of the aspheric surface, i.e. the height from the center of the lens to the edge of the lens. As the equation shows, different values H correspond to different values X. In the present design, K=0, and A, B, C, and D are aspheric coefficients. For the aspheric coefficients of S13: A is −0.281837E-04, B is −0.854095E-05, C is 0.407756E-06, and D is −0.114077E-07. For the aspheric coefficients of S14: A is 0.209996E-03, B is −0.127416E-04, C is 0.861426E-06, and D is −0.274988E-07.

In Table 1, the Radius of Curvature (mm) refers to the radius of curvature of each surface; the Distance (mm) refers to the distance between two neighboring surfaces. For example, the distance of the surface S1 means the distance between the surface S1 and the surface S2. The thickness, refractive index and Abbe number of the lenses, adhesive layers, or low-pass filters in the field of Notes are found with reference to Distance, Refractive Index and Abbe Number values in the corresponding row. Moreover, the surface S1 in Table 1 is a surface of the first lens 212 that is away from the second lens 214. The surface S2 is a surface of the first lens 212 that is in contact with the second lens 214. The surface S3 is a surface of the second lens 214 that is away from the first lens 212. The surfaces S4 and S5 are two surfaces of the third lens 216. The surfaces S6 and S7 are two surfaces of the fourth lens 222. The surface S8 is a surface of the fifth lens 224 that is away from the sixth lens 226. The surface S9 is a surface of the fifth lens 224 that is in contact with the sixth lens 226. The surface S10 is a surface of the sixth lens 226 that is away from the fifth lens 224. The surfaces S11 and S12 are two surfaces of the IR-cutting filter 250, wherein the surface S12 is also function as an aperture stop (STO) to control the volume of the incident light. The surfaces S13 and S14 are two surfaces of the lens 232. The surfaces S15 and S16 are two surfaces of the lens 234. The surface S17 is a surface of the ninth lens 242 that is away from the tenth lens 244. The surface S18 is a surface of the ninth lens 242 that is in contact with the tenth lens 244. The surface S19 is a surface of the tenth lens 244 that is away from the ninth lens 242. The surfaces S20 and S21 are two surfaces of the low-pass filter 260. The surface S22 is the incidence surface of the photosensitive element 50. Parameters about the radii of curvature and distances of each surface are found with reference to Table 1, and are not described herein.

TABLE 2

| | | Wide-End | Middle Position | Tele-End |
|---|---|---|---|---|
| Effective Focal Length (EFL) | | 4.06 | 17 | 81.2 |
| Field of View (FOV) | | 60 | 15 | 3 |
| F Value (F/#) | | 1.8 | 2.2 | 2.5 |
| Variable Distance (mm) | S5 | 1.0000 | 20.604 | 32.010 |
| | S10 | 32.010 | 12.406 | 1.0000 |
| | S16 | 5.2569 | 2.6259 | 9.3612 |
| | S19 | 5.5824 | 8.2134 | 1.4781 |

Some important parameters of the zoom lens 200 at the wide-end, the middle position, and the tele-end are listed in Table 2, including Effective Focal Length (EFL), Field of View (FOV), F Value (F/#), and Variable Distances of the surfaces S5, S10, S16, and S19.

Figure 3A:
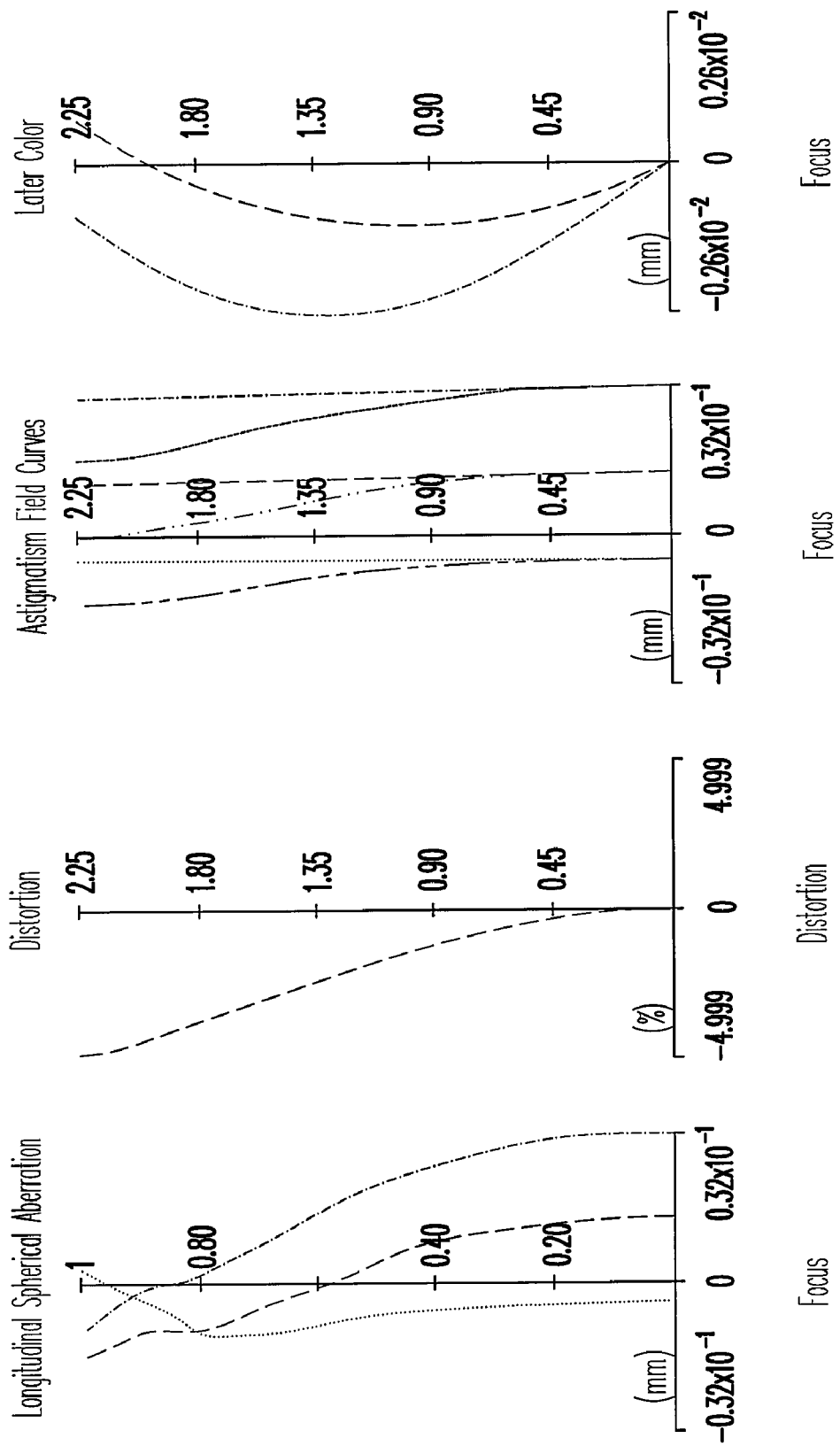
FIGS. 3A-3C are diagrams showing the longitudinal spherical aberration, distortion, astigmatism field curves, and later color corresponding to FIGS. 2A-2C respectively.
Figure 3B:
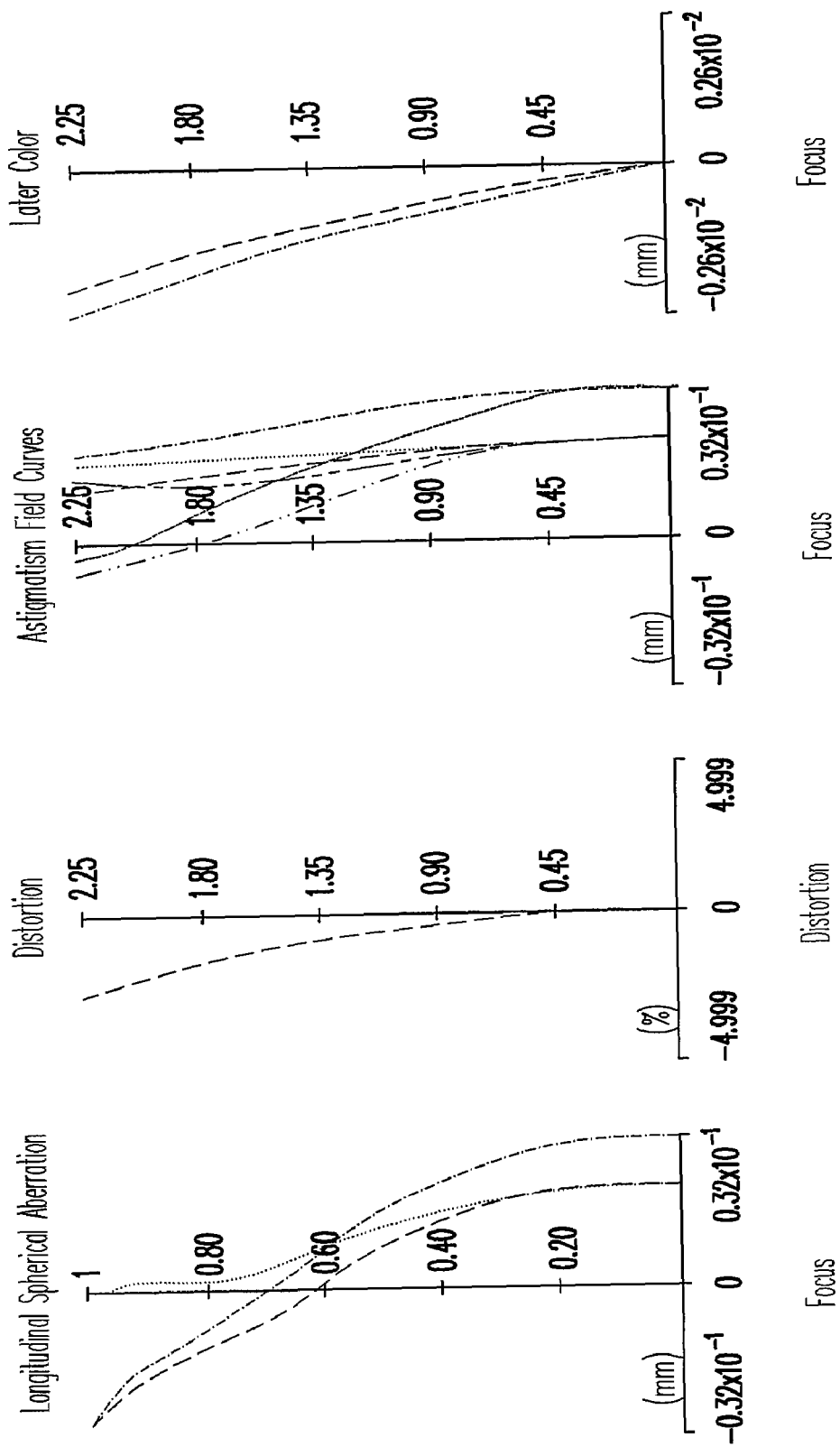
Figure 3C:
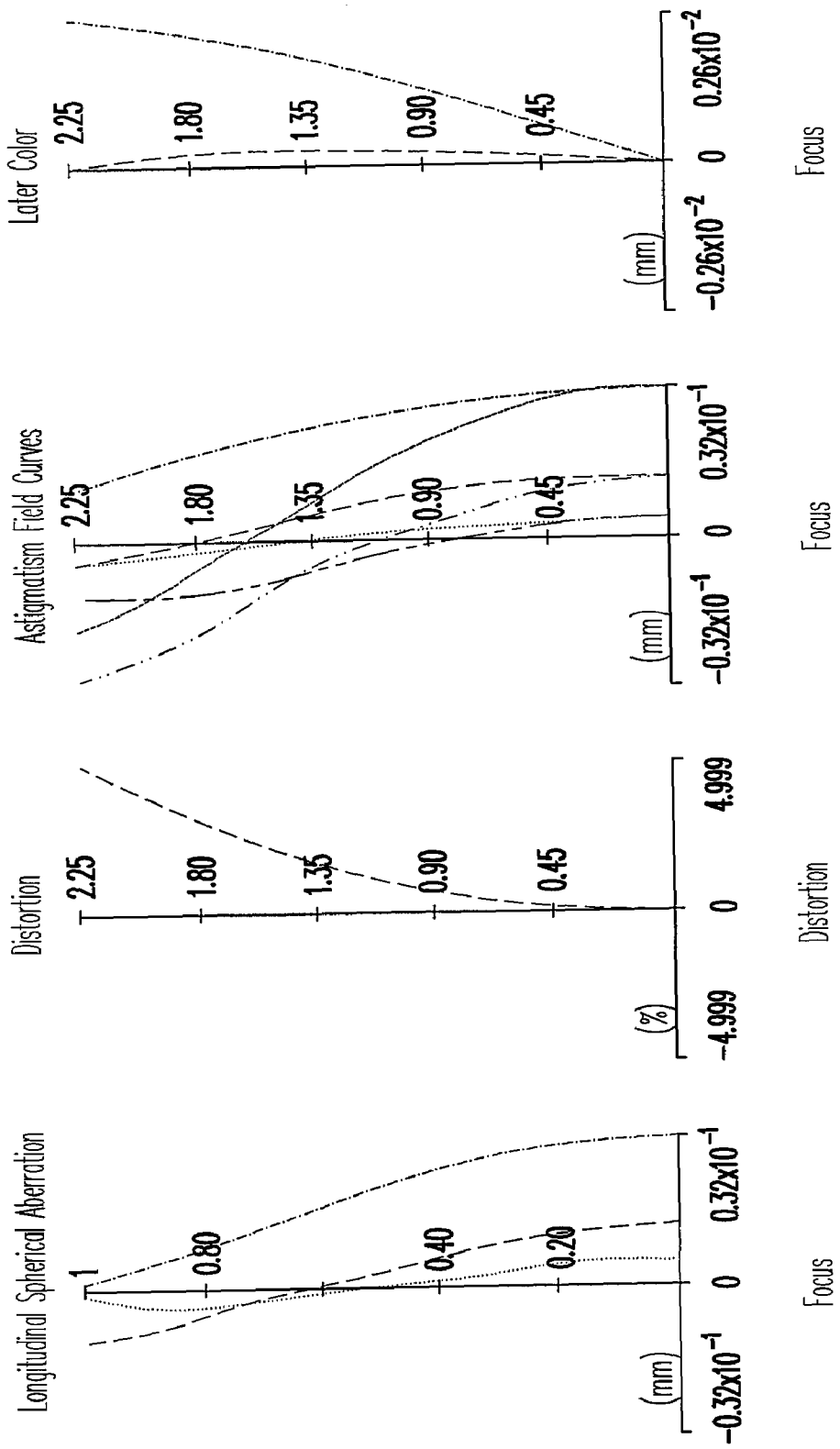

FIGS. 3A-3C are diagrams showing the longitudinal spherical aberration, distortion, astigmatism field curves, and later color corresponding to FIGS. 2A-2C respectively. Referring to FIGS. 3A-3C, the zoom lens 200 of the present invention has favorable optical quality as graphics of longitudinal spherical aberration, distortion, astigmatism field curves, and lateral color are all within the scope of relevant standards.

It is noted that those skilled in the art can make appropriate modifications to the aforementioned parameters according to the reversibility principle of light, so that the zoom lens of the present invention is adaptable to projection systems, which also falls within the scope of the present invention.

To sum up, the zoom lens of the present invention has at least the following advantages.

1. Compared with the conventional zoom lens comprising 11 lenses, the zoom lens of the present invention includes only 10 lenses as the number of lenses of the third lens group is reduced to two. Therefore, in addition to decreasing the material cost of lenses, the manufacturing cost is further reduced as the yield of the total zoom lens is improved.

2. The four lens groups have a positive refractive power, a negative refractive power, a positive refractive power, and a positive refractive power, so as to eliminate the image aberration, and the application of aspheric hybrid lenses makes the zoom lens of the present invention have imaging qualities of high magnification and high resolution.

3. In addition to the function of zooming, the fourth lens group also has the function of image compensation, thus reducing or eliminating the problems of image aberration and imaging plane shift.

4. The specific value of the effective focal length A1 of the zoom length at the wide-end to the diameter A2 of the lens (i.e. A1/A2) is between 0.4 and 0.5, thus effectively ensuring imaging quality.

5. The specific value of the effective focal length A3 of the third length group 230 to the effective focal length A4 of the fourth lens group (i.e. A3/A4) is between 1.5 and 2, thus reducing the volume of the zoom lens of the present invention.

While the present invention has been described with reference to preferred embodiments thereof, it is not intended to limit the present invention. Those skilled in the art will understand that various changes and modifications may be made therein without departing from the spirit and scope of the present invention. Therefore the protection scope of the present invention shall be defined by the following claims.

What is claimed is:

1. A zoom lens, suitable for imaging an object on a photosensitive element, comprising:
   a first lens group, having a positive refractive power;
   a second lens group, having a negative refractive power and disposed between the first lens group and the photosensitive element;
   a third lens group, having a positive refractive power and disposed between the second lens group and the photosensitive element, wherein the third lens group includes two lenses having positive refractive power, and the second lens group is suitable for moving between the first lens group and the third lens group; and
   a fourth lens group, having a positive refractive power and disposed between the third lens group and the photosensitive element, the fourth lens group suitable for moving between the third lens group and the photosensitive element, the fourth lens group including:
      a ninth lens, having a negative refractive power; and
      a tenth lens, having a positive refractive power, and disposed between the ninth lens and the photosensitive element.

2. The zoom lens as claimed in claim 1, wherein the first lens group includes:
   a first lens, having a negative refractive power;
   a second lens, having a positive refractive power and disposed between the first lens and the second lens group; and
   a third lens, having a positive refractive power and disposed between the second lens and the second lens group.

3. The zoom lens as claimed in claim 1, wherein the second lens group includes:
   a fourth lens, having a negative refractive power;
   a fifth lens, having a negative refractive power and disposed between the fourth lens and the third lens group; and
   a sixth lens, having a positive refractive power and disposed between the fifth lens and the third lens group.

4. The zoom lens as claimed in claim 1, wherein the lenses of the third lens group include a seventh lens and an eighth lens, and the eighth lens is disposed between the seventh lens and the fourth lens group, and at least one of the seventh lens and the eighth lens is an aspheric lens.

5. The zoom lens as claimed in claim 4, wherein the aspheric lens is a glass molding lens, a hybrid lens, or a plastic lens.

6. The zoom lens as claimed in claim 1, wherein one of the lenses of the third lens group closer to the second lens group is a meniscus lens, and the meniscus lens is convex to the object.

7. The zoom lens as claimed in claim 1, wherein the second lens group is suitable for moving from the first lens group to the third lens group, the magnification of the zoom lens is shifted from a wide-end to a tele-end, and the effective focal length of the zoom lens at the wide-end is A1, and the diameter of the lens of the third lens group closer to the second lens group is A2, and $0.4 < A1/A2 < 0.5$.

8. The zoom lens as claimed in claim 1, wherein the effective focal length of the third lens group is A3, and the effective focal length of the fourth length group is A4, and $1.5 < A3/A4 < 2$.

9. The zoom lens as claimed in claim 1, wherein under various magnification factors, the incidence angle of the chief ray of the imaging light beam of the object incident to the photosensitive element is less than 10 degrees.

* * * * *